US005757549A

United States Patent [19]

Sumi

[11] Patent Number: 5,757,549
[45] Date of Patent: May 26, 1998

[54] VARIABLE FOCAL POSITION OPTICAL SYSTEM AND LIGHT BEAM SCANNING APPARATUS

[75] Inventor: Katsuto Sumi, Kanagawa, Japan

[73] Assignee: Fuji Photo Film Co., Ltd., Kanagawa, Japan

[21] Appl. No.: 760,275

[22] Filed: Dec. 4, 1996

Related U.S. Application Data

[62] Division of Ser. No. 389,211, Feb. 15, 1995, Pat. No. 5,610,758.

[30] Foreign Application Priority Data

Feb. 15, 1994 [JP] Japan ................... 6-18317

[51] Int. Cl.⁶ ................... G02B 27/10; G02B 26/08
[52] U.S. Cl. ................... 359/618; 359/205
[58] Field of Search ................... 359/618, 319, 359/201, 205

[56] References Cited

U.S. PATENT DOCUMENTS

| | | | |
|---|---|---|---|
| 4,733,064 | 3/1988 | Ishikawa | 250/201 |
| 5,276,544 | 1/1994 | Maeda | 359/196 |
| 5,355,181 | 10/1994 | Ashizaki et al. | 348/744 |
| 5,386,107 | 1/1995 | Dvorkis et al. | 235/472 |

FOREIGN PATENT DOCUMENTS

| | | | |
|---|---|---|---|
| 55-67722 | 5/1980 | Japan | G02B 27/17 |
| 62-129814 | 6/1987 | Japan | G02B 1/13 |
| 62-129815 | 6/1987 | Japan | G02B 1/13 |
| 62-129816 | 6/1987 | Japan | G02B 1/13 |
| 62-151824 | 7/1987 | Japan | G02F 1/01 |
| 62-153933 | 7/1987 | Japan | G02F 1/01 |
| 1230017 | 9/1989 | Japan | G02B 27/00 |
| 3290610 | 12/1991 | Japan | G02B 26/10 |
| 62-14176 | 8/1994 | Japan | G02B 26/10 |

*Primary Examiner*—Georgia Y. Epps
*Assistant Examiner*—Ricky Mack
*Attorney, Agent, or Firm*—Sughrue, Mion, Zinn, Macpeak & Seas, PLLC

[57] ABSTRACT

A variable focal position optical system which includes a variable focal length lens subsystem whose focal length is variable and a fixed focal length lens subsystem whose focal length is fixed. The variable focal length lens subsystem and the fixed focal length lens subsystem are arranged such that a distance between a principal point of the variable focal length lens subsystem and a principal point of the fixed focal length lens subsystem at a variable focal length lens subsystem side is substantially equal to the focal length of the fixed focal length lens subsystem. As a result, it is possible to change only a focal position with substantially no change to a beam diameter at the focal position.

2 Claims, 10 Drawing Sheets

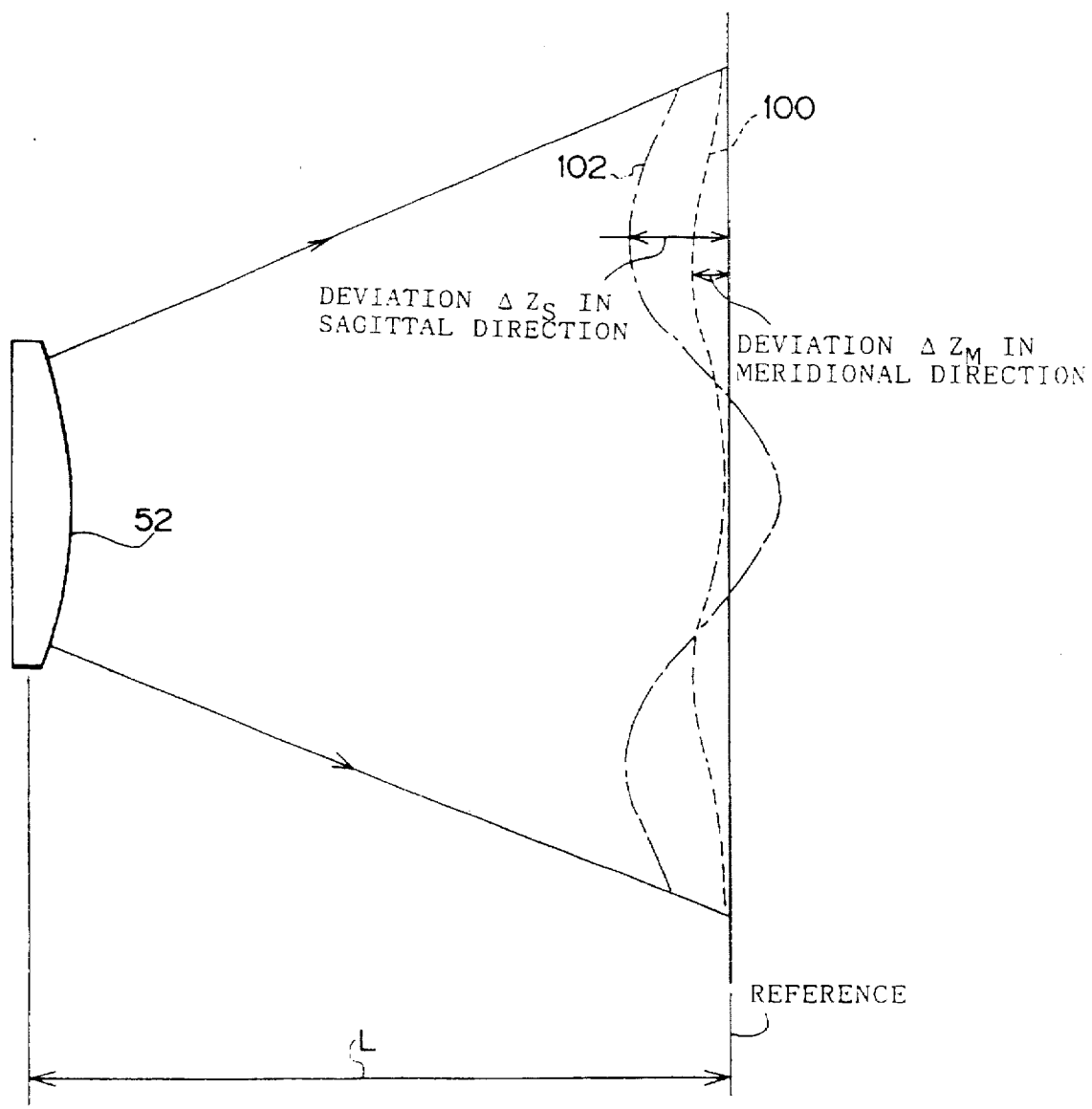

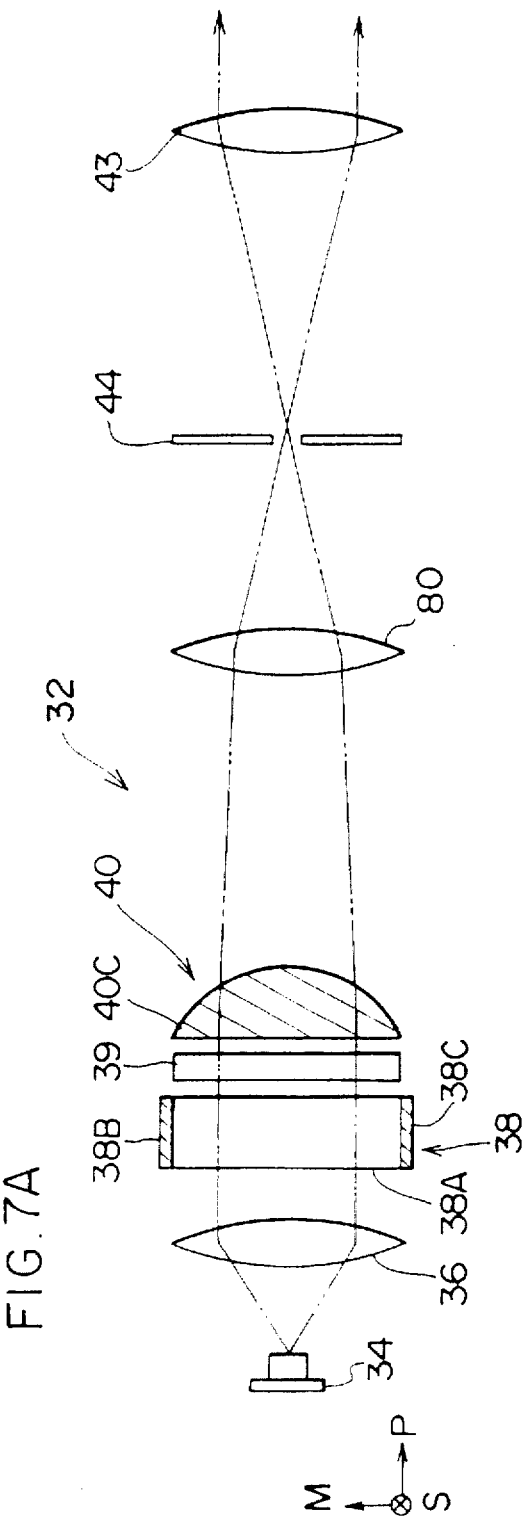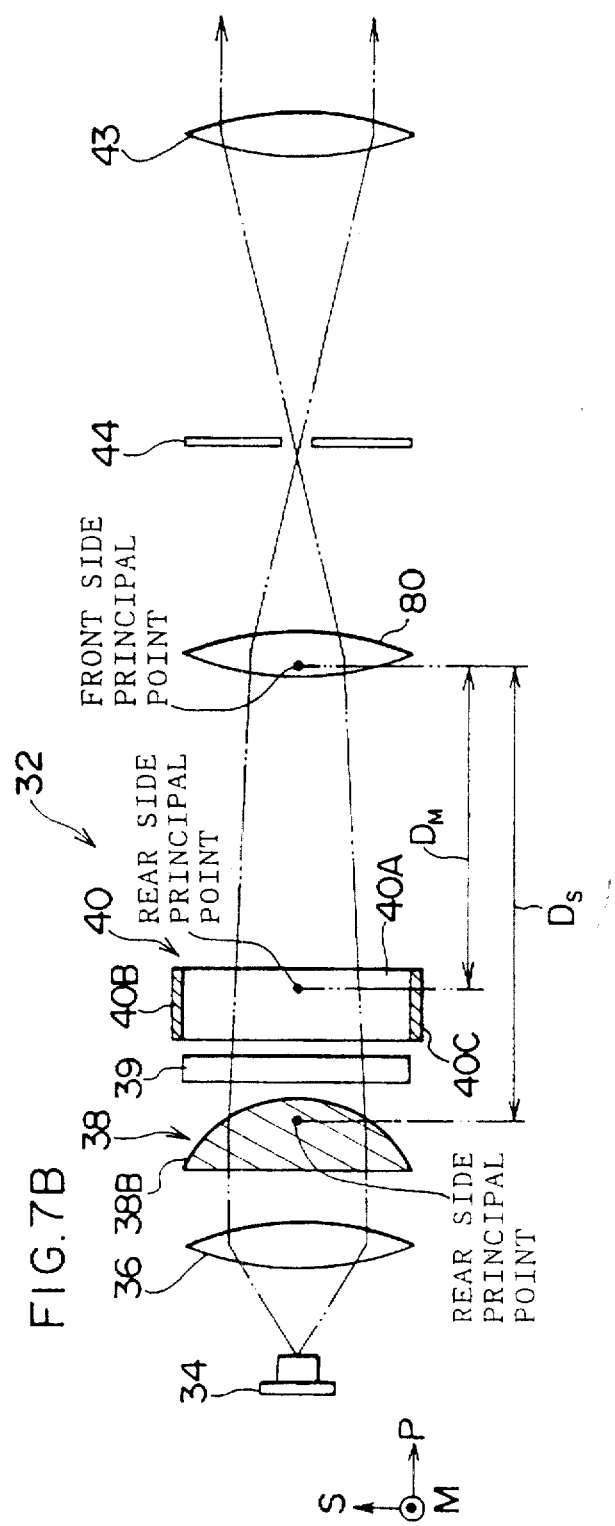

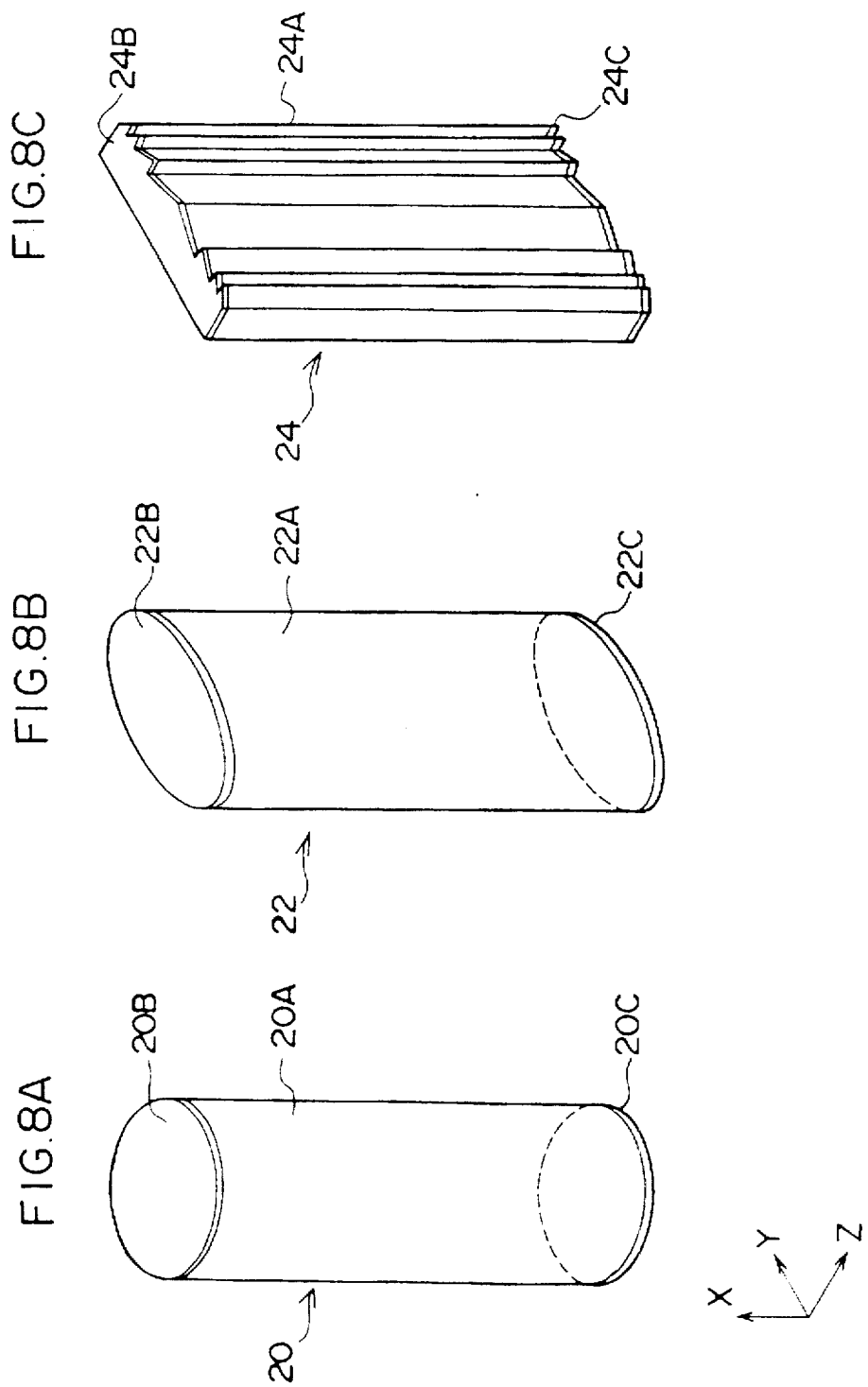

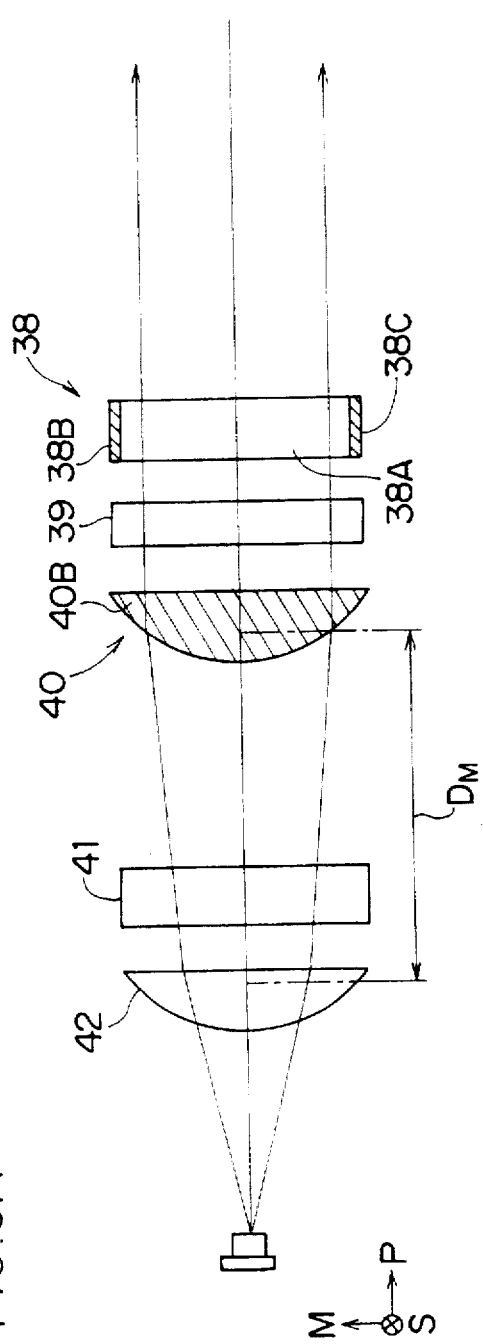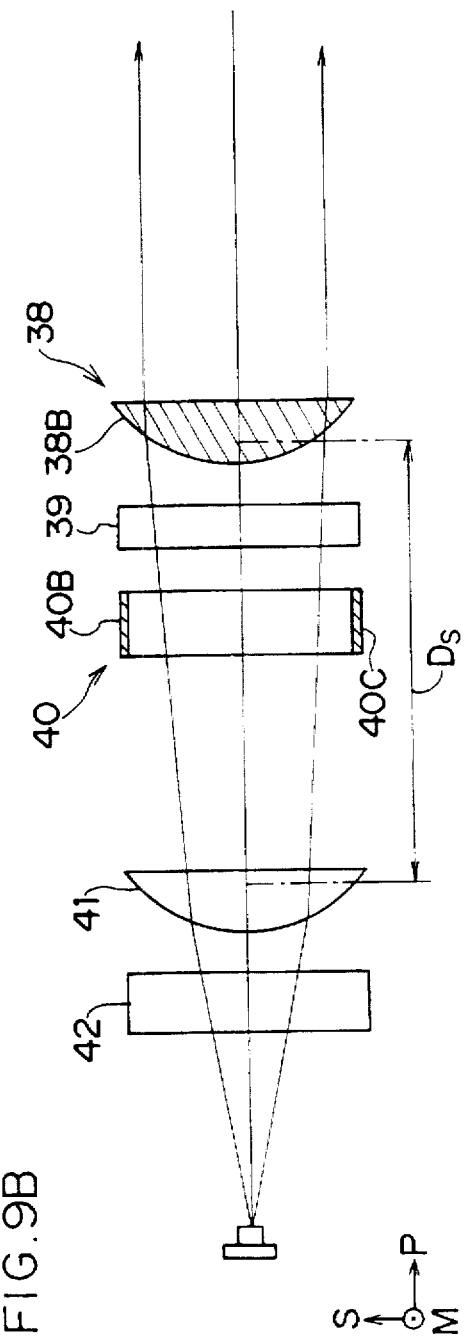

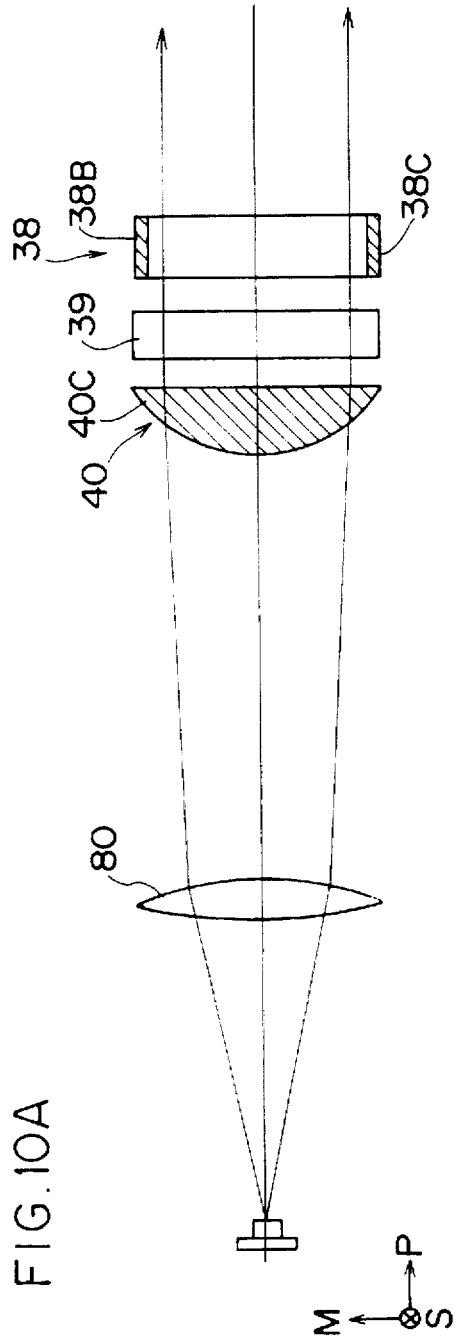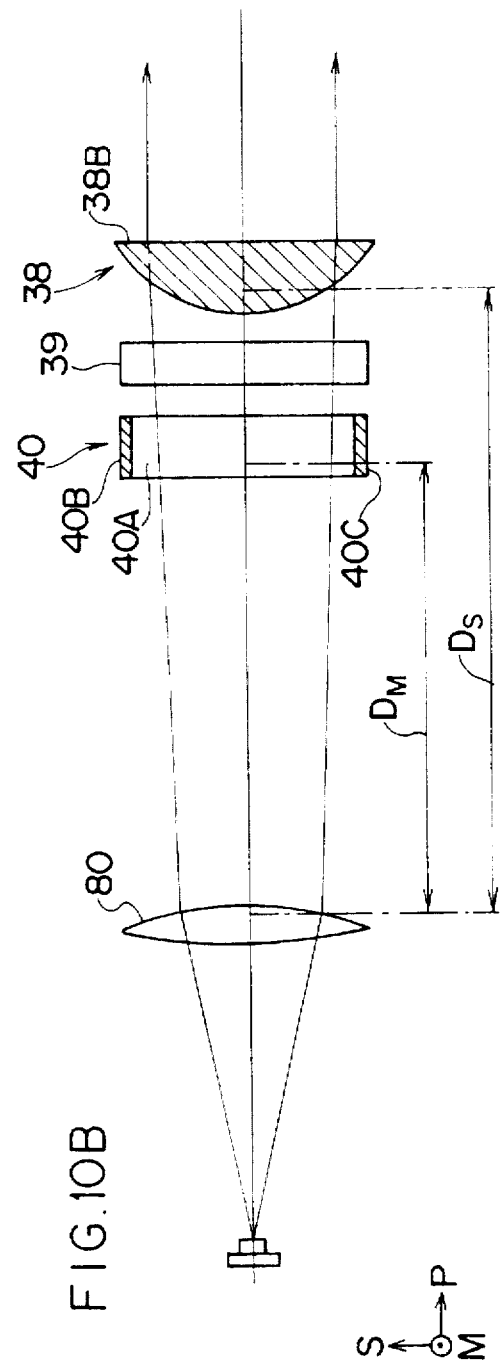
FIG.10A
FIG.10B

VARIABLE FOCAL POSITION OPTICAL SYSTEM AND LIGHT BEAM SCANNING APPARATUS

This is a divisional of application Ser. No. 08/389,211 filed Feb. 15, 1995 now U.S. Pat. No. 5,610,758.

BACKGROUND OF THE INVENTION

1. Field of the Invention

The present invention relates to a variable focal position optical system and to a light beam scanning apparatus, and in particular, to a variable focal position optical system in which the focal position of an incident light beam is varied, and to a light beam scanning apparatus which includes the variable focal position optical system.

2. Description of the Related Art

Laser computer output microfilmers (laser COMs) are known as devices for recording information such as characters or images onto a recording material by a light beam. In the laser COM, for example, a laser beam is scanned on the basis of information outputted from a computer, and information such as characters is directly recorded onto a recording material such as a microfilm (Japanese Patent Application Laid-Open No. 55-67722). In this type of laser beam recording device, after the laser beam is scanned by scanning means such as a polygon mirror, a galvanometer mirror or the like, the laser beam is imaged onto the recording surface of a recording material by a scanning lens such as an fθ lens. Characters, an image or the like are thereby recorded onto the recording material.

Generally, curvature of field remains at the scanning lens, and even if an ideal (i.e., no wave aberration) laser beam is incident on the scanning lens, the beam waist position does not correspond to the recording surface of the recording material. Further, due to reasons such as the curvature of the scanning lens being non-uniform, the focal position (beam waist position) of the laser beam which is scanned by the scanning means and passes through the scanning lens does not always correspond to the recording surface (so-called "defocus"). Especially in a case in which a semiconductor laser has an astigmatism and the laser beam irradiated from the semiconductor laser is used as the light beam, there is deviation (so-called astigmatic difference) between the beam waist position in the main scanning direction of the laser beam and the beam waist position in the subscanning direction due to the astigmatism of the semiconductor laser and the optical system.

Distortion of the shape of the laser beam illuminated onto the recording surface occurs due to the defocus and astigmatic difference, and deficiencies such as lack of clarity are generated in portions of the characters, image or the like recorded on the recording surface. In recent years, the demands made on light beam recording devices which can record images of larger sizes have increased. Deterioration of image quality which is caused by the above-mentioned phenomena and which accompanies the increase in sizes of recorded images has come to be a significant problem.

In order to solve this problem, Japanese Patent Application Laid-Open No. 3-290610 uses a "cylindrical lens whose focal length can be varied by electric operation". By varying the focal length of the cylindrical lens, the beam waist position in the subscanning direction of the laser beam is varied. Curvature, with respect to the recording surface, of the image surface in the subscanning direction, which curvature corresponds to the locus of the beam waist position in the subscanning direction of the laser beam (hereinafter referred to as "curvature of field") is thereby corrected.

In the above-mentioned publication, the beam waist position is changed by varying the focal length of the cylindrical lens. However, when the focal length is varied in this way, a drawback arises in that the beam diameter ω' at the beam waist position of the laser beam exiting from the cylindrical lens (hereinafter, "beam waist diameter") fluctuates, as is clear from following formula (1):

$$\omega' = K \cdot \frac{\lambda \cdot f}{\omega} \quad (1)$$

wherein

ω: beam diameter of the laser beam incident on the cylindrical lens

λ: wavelength of the incident light beam f: focal length

K: constant.

Accordingly, even if the focal length f of the cylindrical lens is varied such that the beam waist position of the laser beam always corresponds to the recording surface, the beam waist diameter of the laser beam varies as the focal length f of the cylindrical lens varies. Therefore, drawbacks still arise such as portions of the characters, images or the like recorded on the recording surface are unclear.

SUMMARY OF THE INVENTION

In view of the aforementioned, an object of the present invention is to provide a variable focal position optical system in which the beam waist position of an incident light beam can be moved without the beam waist diameter thereof being varied. Another object of the present invention is to provide an light beam scanning apparatus which can illuminate a light beam of a substantially constant beam diameter onto an object to be illuminated.

In order to achieve the above-described objects, a first aspect of the present invention is a variable focal position optical system comprising: a variable focal length lens subsystem whose focal length is variable; and a fixed focal length lens subsystem whose focal length is fixed, wherein the variable focal length lens subsystem and the fixed focal length lens subsystem are arranged such that a distance between a principal point of the variable focal length lens subsystem and a principal point of the fixed focal length lens subsystem is substantially equal to the focal length of the fixed focal length lens subsystem.

A second aspect of the present invention is a variable focal position optical system comprising: a first variable focal length lens subsystem which has lens power in a first direction orthogonal to an optical axis and whose focal length is variable; a second variable focal length lens subsystem which has lens power in a second direction, which is orthogonal to the optical axis and which is different than the first direction, and whose focal length is variable; a first fixed focal length lens subsystem which has lens power in the first direction and whose focal length is fixed; and a second fixed focal length lens subsystem which has lens power in the second direction and whose focal length is fixed, wherein the first variable focal length lens subsystem and the first fixed focal length lens subsystem are arranged such that a distance between a principal point of the first variable focal length lens subsystem and a principal point of the first fixed focal length lens subsystem is substantially equal to the focal length of the first fixed focal length lens subsystem, and the second variable focal length lens subsystem and the second fixed focal length lens subsystem are arranged such that a distance between a principal point of the second variable focal length lens subsystem and a principal point of the second fixed focal length lens subsystem is substantially equal to the focal length of the second fixed focal length lens subsystem.

A third aspect of the present invention is a variable focal position optical system comprising: a first variable focal length lens subsystem which has lens power in a first direction orthogonal to an optical axis and whose focal length is variable; a second variable focal length lens subsystem which has lens power in a second direction, which is orthogonal to the optical axis and which is different than the first direction, and whose focal length is variable; and a fixed focal length lens subsystem whose focal length is fixed and which is positioned such that the first variable focal length lens subsystem and the second variable focal length lens subsystem are positioned at a side of one principal point of the fixed focal length lens subsystem, wherein the respective lens subsystems are arranged such that a difference between the focal length of the fixed focal length lens subsystem and a distance between a principal point of the first variable focal length lens subsystem and a principal point of the fixed focal length lens subsystem, and a difference between the focal length of the fixed focal length lens subsystem and a distance between a principal point of the second variable focal length lens subsystem and a principal point of the fixed focal length lens subsystem, are respectively less than or equal to predetermined values.

A fourth aspect of the present invention is a light beam scanning apparatus comprising: a scanning optical system which scans a light beam irradiated from a light source onto an object to be illuminated; a variable focal position optical system whose focal position is variable; and a control device which controls the focal position of the variable focal position optical system such that a beam waist position of the light beam scanned onto the object substantially coincides with a surface of the object. Any one of the variable focal position optical systems of the first through the third aspects may be used as the variable focal position optical system in the fourth aspect.

First, the principles of the present invention will be described. FIGS. 1A and 1B illustrate a case in which a parallel light beam of a beam diameter ω passes through an optical system 10 formed by a variable focal length lens $L_V$ whose focal length can be changed (represented schematically as a single lens in FIG. 1) and a fixed focal length lens $L_F$ having a focal length $f_F$ (a constant value). The optical system 10 is arranged such that the distance between the principal point of the variable focal length lens $L_V$, which principal point is positioned at the fixed focal length lens $L_F$ side, and the principal point of the fixed focal length lens $L_F$, which principal point is positioned at the variable focal length lens $L_V$ side, is equal to the focal length $f_F$ of the fixed focal length lens $L_F$.

As illustrated in FIG. 1A, given that $f_V$ is the focal length of the variable focal length lens L, the focal length $f_C$ of the optical system 10 formed from the variable focal length lens $L_V$ and the fixed focal length lens $L_F$, and the distance S between the rear side principal point of the fixed focal length lens $L_F$ and the focal position are as expressed by following formulae (2), (3) because $d=f_F$.

$$f_C = \frac{f_V \cdot f_F}{f_V + f_F - d} = f_F \quad (2)$$

$$S = \frac{f_F(f_V - d)}{f_V + f_F - d} = \frac{f_F(f_V - f_F)}{f_V} \quad (3)$$

As is clear from formula (2), the focal length $f_C$ of the optical system 10 (the focal length of the combination lens formed from the variable focal length lens $L_V$ and the fixed focal length lens $L_F$) is equal to the focal length $f_F$ of the fixed focal length lens $L_F$. Even if the focal length $f_V$ of the variable focal length lens $L_V$ varies, the focal length $f_C$ of the optical system 10 does not vary. In contrast, as is clear from formula (3), the focal position determined by the distance S varies in accordance with variations in the focal length $f_V$ of the variable focal length lens $L_V$. This is due to the fact that the position of the rear side principal point of the combination lens (see FIG. 1A), which position exists at a position which is distanced from the focal position by the focal length $f_C$, varies in accordance with variations in the focal length $f_V$ of the variable focal length lens $L_V$. With the rear side principal point of the fixed focal length lens $L_F$ as a reference, the distance $S-f_C$ from the position of the rear side principal point of the combination lens to the rear side principal point of the fixed focal length lens $L_F$ can be expressed by the following relation from formulae (2) and (3):

$$S - f_C = \frac{f_F(f_V - f_F)}{f_V} - f_F = \frac{-f_F^2}{f_V}$$

Let the beam diameter at the focal position (beam waist position) be $ω_0'$ (see FIG. 1A) in a case in which the focal length of the variable focal length lens $L_V$ is $f_V$. Accordingly, the beam diameter $ω_1'$ at the focal position and the amount of variation ΔS in the focal position when the focal length of the variable focal length lens $L_V$ increases by $Δf_V$ as illustrated in FIG. 1B are as expressed by following formulae (4), (5). It is possible to change (move) only the focal position, i.e., only the beam waist position of the light, by ΔS without varying the beam diameter ω' at the light beam irradiating side of the optical system 10.

$$ω_1' = K \cdot \frac{λ \cdot f_F}{ω} = ω_0' \quad (4)$$

(∴ the beam diameter ω' does not vary)

$$ΔS = \frac{f_F(f_V + Δf_V - d)}{f_V + Δf_V} - \frac{f_F(f_V - d)}{f_V}$$
$$= \frac{f_F \cdot d}{f_V} \cdot \frac{Δf_V}{f_V + Δf_V} = \frac{f_F^2 \cdot Δf_V}{f_V(f_V + Δf_V)} \quad (5)$$

On the basis of the above discussion, in the first aspect of the present invention, the variable focal position optical system includes a variable focal length lens subsystem whose focal length can be changed, and a fixed focal length lens subsystem whose focal length is fixed. The variable focal length lens subsystem and the fixed focal length lens subsystem are arranged such that the distance between the principal point of the variable focal length lens subsystem at the fixed focal length lens subsystem side and the principal point of the fixed focal length lens subsystem at the variable focal length lens subsystem side is substantially equal to the focal length of the fixed focal length lens subsystem. In this way, the formulae (4), (5) are substantially established for the variable focal position optical system relating to the present invention. Therefore, even if the focal length of the variable focal length lens subsystem is varied, the focal length of the variable focal position optical system hardly varies. For a light beam incident on the variable focal position optical system relating to the present invention, it is possible to move only the focal position thereof with hardly any variation in the beam diameter at the focal position.

The variable focal length lens subsystem and the fixed focal length lens subsystem may each be structured by a single lens as illustrated schematically in FIG. 1, or may each be structured by a plurality of lenses. In a case in which each lens subsystem is formed by a plurality of lenses, the positions of the above-described principal points correspond to the positions of the principal points of a single hypothetical lens which is equivalent to the plurality of lenses, and the focal length corresponds to the focal length of the single hypothetical lens. If the pluralities of lenses forming the lens subsystems are respectively arranged as in the present invention on the basis of the positions of the principal points and the focal lengths, formulae (4) and (5) can be substantially established.

The lenses forming the variable focal length lens subsystem and the fixed focal length lens subsystem may be lenses having lens power in every direction orthogonal to the optical axis, such as a lens having rotation symmetry with respect to the optical axis of the incident bundle of rays (hereinafter, such a lens will be called a rotation symmetry lens). Alternatively, the lenses forming the variable focal length lens subsystem and the fixed focal length lens subsystem may be lenses which have lens power only in a specific direction, such as a cylindrical lens (when a cylindrical lens is used as the lens forming the variable focal length lens subsystem, only the beam waist position in the specific direction is varied). However, when the lenses forming the variable focal length lens subsystem and the fixed focal length lens subsystem are respectively a lens having lens power in only a predetermined direction, the respective lenses must be arranged such that the direction in which the lens forming the variable focal length lens subsystem has lens power and the direction in which the lens forming the fixed focal length lens subsystem has lens power coincide.

The focal length of the lens varies in accordance with the refractive index of the medium of the lens, the curvatures of the spherical surfaces of the lens, and the thickness of the lens. Therefore, a lens, in which at least one of the refractive index, the curvature, and the surfaces separation can be changed, may be used as the lens forming the variable focal length lens subsystem. A lens using an electrooptic material such as PLZT and having an electrooptical effect may be used as a lens whose refractive index can be changed. For example, is preferable to use an optical element, such as that which the applicant of the present application previously proposed in Japanese Patent Application Laid-Open No. 6-214178, which optical element includes an electrooptic medium having a pair of parallel planes and formed so as to have lens power in a predetermined direction and exhibiting an electrooptical effect, and electrodes provided at the pair of parallel planes such that a uniform electric field is applied between the pair of parallel planes within the electrooptic medium.

The optical element disclosed in Japanese Patent Application Laid-Open No. 1-230017 may be used with the present invention. In this publication, electrodes are adhered to surfaces of a rectangular electrooptic medium such that a refractive index distribution is generated within the electrooptic medium, and the focal length varies due to variations in the voltage applied to the electrodes. Alternatively, lenses disclosed in Japanese Patent Application Laid-Open Nos. 62-129814, 62-129815 and 62-125816 may be applied to the present invention. The focal lengths of these lenses vary due to variations in the refractive index of the liquid crystal which serves as an electrooptic material, which variations are caused by the working of an electric field. Also applicable to the present invention is the lens disclosed in Japanese Patent Application Laid-Open No. 62-153933 whose focal length varies due to variations in the refractive index of an organic liquid material serving as an electrooptic material, which variations are caused by the working of an electric field.

The lens disclosed in Japanese Patent Application Laid-Open No. 62-151824, whose focal length varies due to variations in the volume of a macromolecular gel-like substance which variations are due to electric energy, can be used as a lens having variable curvature. Further, this type of lens using a material whose volume varies due to electrical energy or the like can also be used as a lens in which the thickness thereof is variable.

The variable focal position optical system relating to the present invention may include a plurality of variable focal length lens subsystems having lens power in respectively different directions. In this case, as described in the second aspect of the present invention, it is preferable that the variable focal position optical system includes: a first variable focal length lens subsystem which has lens power in a first predetermined direction and whose focal length is variable; a second variable focal length lens subsystem which has lens power in a second predetermined direction, which is different than the first predetermined direction, and whose focal length is variable; a first fixed focal length lens subsystem which has lens power in the first predetermined direction and whose focal length is fixed; and a second fixed focal length lens subsystem which has lens power in the second predetermined direction and whose focal length is fixed, wherein the first variable focal length lens subsystem and the first fixed focal length lens subsystem are arranged such that the distance between a principal point of the first variable focal length lens subsystem which point is positioned at a first fixed focal length lens subsystem side and a principal point of the first fixed focal length lens subsystem which point is positioned at a first variable focal length lens subsystem side is substantially equal to the focal length of the first fixed focal length lens subsystem, and the second variable focal length lens subsystem and the second fixed focal length lens subsystem are arranged such that the distance between a principal point of the second variable focal length lens subsystem which point is positioned at a second fixed focal length lens subsystem side and a principal point of the second fixed focal length lens subsystem which point is positioned at a second variable focal length lens subsystem side is substantially equal to the focal length of the second fixed focal length lens subsystem.

When light beams are incident on the variable focal position optical system having the above structure and the focal length of the first variable focal length lens subsystem is varied, only the focal position along the first predetermined direction (the beam waist position of the light beam along the first predetermined direction) moves, and the beam waist position of the light beam along the second predetermined direction does not change. Similarly, when the focal length of the second variable focal length lens subsystem is varied, only the focal position along the second predetermined direction (the beam waist position of the light beam along the second predetermined direction) moves, and the focal position of the light beam along the first predetermined direction does not move. Even if the focal length of either of the variable focal length lens subsystems is varied, there is substantially no change in the beam waist diameter of the light beam.

Accordingly, by independently and respectively varying the focal length of the first variable focal length lens subsystem and the focal length of the second variable focal length lens subsystem, the beam waist position of the light beam along the first predetermined direction and the beam waist position along the second predetermined direction can be varied independently without the beam waist diameter of the light beam varying.

In a case in which the variable focal position optical system is structured as described above so as to include a plurality of variable focal length lens subsystems having lens power in respectively different directions, the present invention is not limited to a structure such as that of the second aspect in which a plurality of fixed focal length lens subsystems are provided. In accordance with the third aspect of the present invention, the variable focal position optical system may include a first variable focal length lens subsystem which has lens power in a first predetermined direction and whose focal length is variable; a second variable focal length lens subsystem which has lens power in a second direction different than the first direction and whose focal length is variable; and a fixed focal length lens subsystem which has lens power in the first predetermined direction and in the second predetermined direction and whose focal length is fixed and which is disposed such that the first variable focal length lens subsystem and the second variable focal length lens subsystem are positioned at a side of one principal point of the fixed focal length lens subsystem, wherein a difference between a focal length of the fixed local length lens subsystem and a distance between the principal point of the first variable focal length lens subsystem which point is positioned at a fixed focal length lens subsystem side and a principal point of the fixed focal length lens subsystem, and a difference between the focal length of the fixed focal length lens subsystem and a distance between the principal point of the second variable focal length lens subsystem which point is positioned at, a fixed focal length lens subsystem side and a principal point of the fixed focal length lens subsystem, are respectively less than or equal to predetermined values.

As described above, in a case in which the variable focal position optical system is structured so as to include a first variable focal length lens subsystem, a second variable focal length lens subsystem, and a single fixed focal length lens subsystem, the beam waist position of the incident light beam along the first predetermined direction and the beam waist position along the second predetermined direction can be moved independently, and the structure of the variable focal position optical system can be simplified. In the above structure, it is difficult to make the distance between the principal point of the first variable focal length lens subsystem at the fixed focal length lens subsystem side and the principal point of the fixed focal length lens subsystem, and the distance between the principal point of the second variable focal length lens subsystem at the fixed focal length lens subsystem side and the principal point of the fixed focal length lens subsystem, respectively equal to the focal length of the fixed focal length lens subsystem. When the focal length of each variable focal length lens subsystem is varied, the beam waist diameter may vary.

However, by an arrangement in which the respective differences of the above distances with respect to the focal length of the fixed focal length lens subsystem are predetermined values or less, even if the respective focal lengths of the first variable focal length lens subsystem and the second variable focal length lens subsystem are varied in order to move the beam waist position, the variation in the beam diameter along the first predetermined direction and the variation in the beam diameter along the second predetermined direction can respectively be kept small.

In any of the inventions of the first through the third aspects, in a case in which a substantially parallel beam is incident on the variable focal position optical system or in a case in which a light beam of substantially parallel light rays emerges from the variable focal position optical system, each lens subsystem is disposed on the optical path of the light beam such that the fixed focal length lens subsystem as viewed from the variable focal length lens subsystem is positioned at at least one of a point of convergence side and a point of divergence side, i.e., at the side at which the substantially parallel beam is incident or emerges and the side opposite thereto (see FIGS. 9A, 9B, 10A, 10B). In this way, formulae (4), (5) are substantially established for the variable focal position optical system related to the present invention.

Accordingly, in a case which the respective lens subsystems are arranged such that the substantially parallel beam is incident on the variable focal position optical system, variations in the beam waist diameter at the point of convergence positioned at the side of the fixed focal length lens subsystem which side is opposite the side at which the variable focal length lens subsystem is disposed, when the focal length of the variable focal length lens subsystem is varied, can be suppressed. The same effects can be achieved even if the parallel light diverges slightly. Further, as illustrated in FIGS. 9A, 9B, 10A, 10B, in a case in which the respective lens subsystems are arranged so that divergent light from the point of divergence is incident on the variable focal position optical system, when the focal length of the variable focal length lens subsystem is varied, the beam diameter and degree of parallelism of the substantially parallel light beam exiting from the variable focal position optical system can be varied such that the position of the point of divergence hypothetically moves with little variation in the beam waist diameter at the point of divergence.

In the fourth aspect of the present invention, the variable focal position optical system of any of the first through the third aspects is disposed on the optical path of a light beam, and the focal length of the variable focal length lens subsystem of the variable focal position optical system is controlled such that the beam waist position of the light beam scanned onto the object to be illuminated substantially coincides with the surface to be illuminated. In the inventions of the first through the third aspects described above, variations in the beam waist diameter of a light beam in a case in which the focal length of the variable focal length lens subsystem is varied and the beam waist position of the light beam is varied, can be controlled. Accordingly, by disposing the variable focal position optical system of any of the first through the third aspects on the optical path of the light beam, a light beam of substantially uniform beam diameter can be illuminated onto the object to be illuminated.

BRIEF DESCRIPTION OF THE DRAWINGS

FIG. 6 is a conceptual view for explaining image surfaces, astigmatic difference and offset in the meridional and sagittal directions.

FIG. 7A is a plan view illustrating a meridional direction schematic structure of a laser beam irradiating device relating to a second embodiment.

FIG. 7B is a plan r view illustrating a sagittal direction schematic structure of the laser beam irradiating device relating to the second embodiment.

FIG. 8A is a perspective view illustrating another example of on optical element.

FIG. 8B is a perspective view illustrating still another example of an optical element.

FIG. 8C is a perspective view illustrating yet another example of an optical element.

FIG. 9A is a plan view illustrating a meridional direction schematic structure of a variant example of the laser beam irradiating device relating to the first embodiment.

FIG. 9B is a plan view illustrating a sagittal direction schematic structure of a variant example of the laser beam irradiating device relating to the first embodiment.

FIG. 10A is a plan view illustrating a meridional direction schematic structure of a variant example of the laser beam irradiating device relating to the second embodiment.

FIG. 10B is a plan view illustrating a sagittal direction schematic structure of a variant example of the laser beam irradiating device relating to the second embodiment.

DESCRIPTION OF THE PREFERRED EMBODIMENTS

Figure 1A:
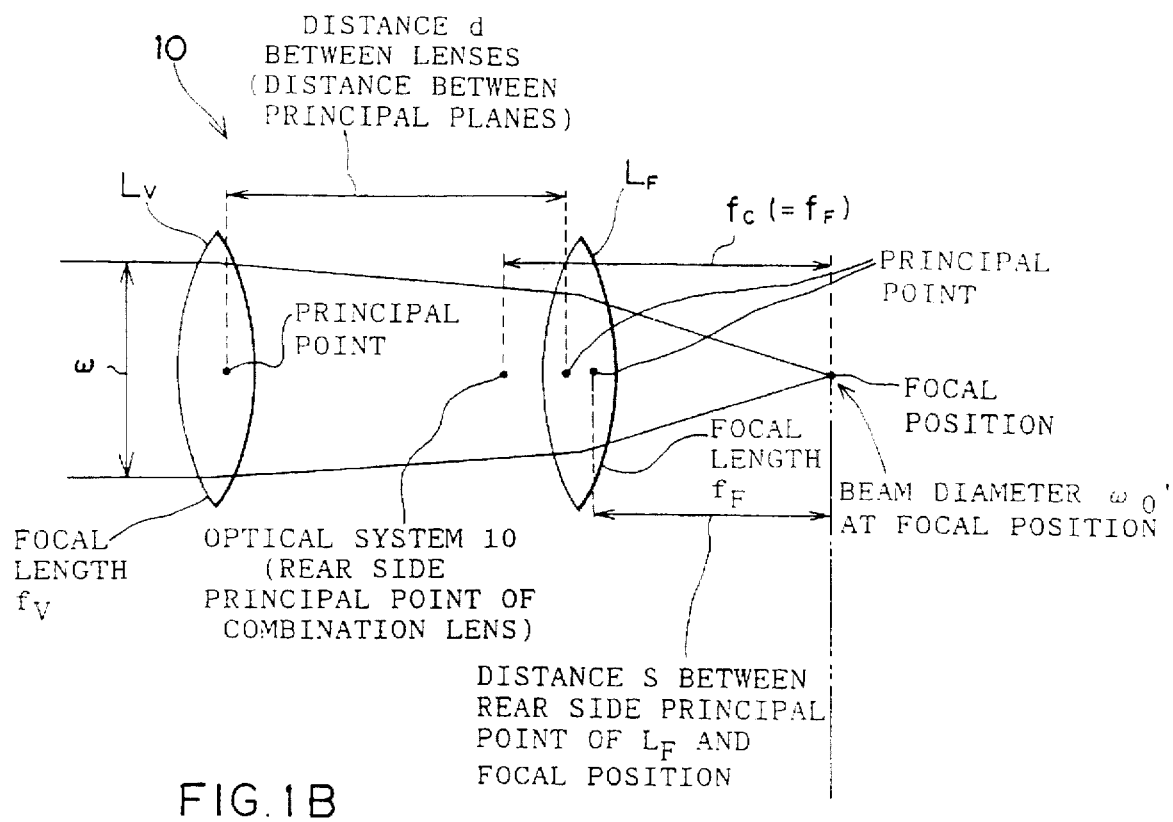
FIG. 1A is an explanatory view illustrating a structure of an optical system, for explaining operation of the present invention.
Figure 1B:
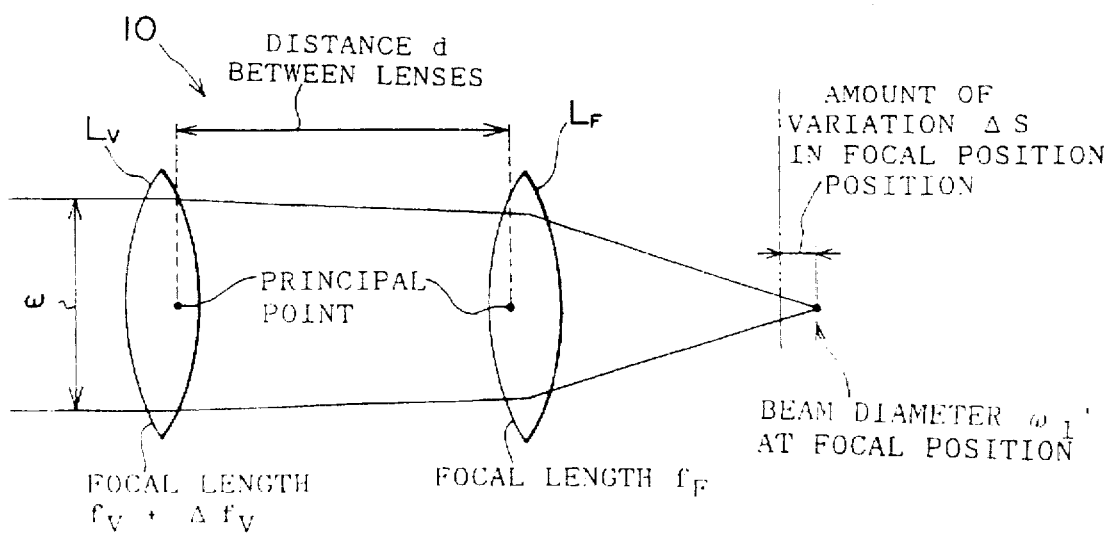
FIG. 1B is an explanatory, view illustrating a structure of an optical system for explaining operation of the present invention.
Figure 2:
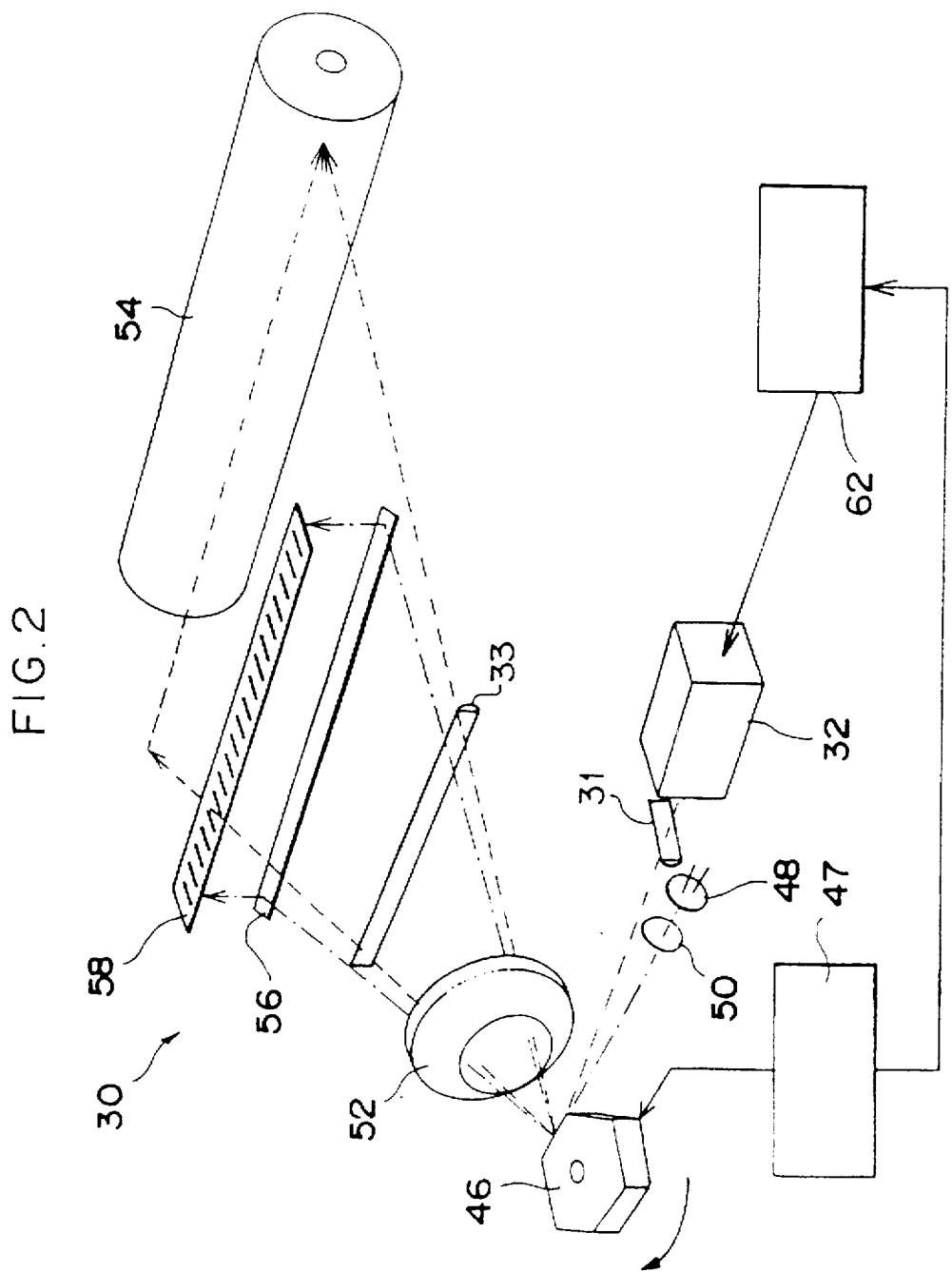
FIG. 2 is a perspective view illustrating a schematic structure of a laser beam recording device.

FIG. 2 illustrates a laser beam recording device 30 relating to a first embodiment. The laser beam recording device 30 includes a laser beam irradiating device 32 which irradiates a laser beam of substantially parallel rays. The laser beam irradiating device 32 will be described in more detail later. A cylindrical lens 31 for correcting the tilt of the surface of a polygon mirror and a polygon mirror 46 are disposed at the irradiating side of the laser beam irradiating device 32. The rotation of the polygon mirror 46 is controlled by a drive control circuit 47.

A semiconductor laser for synchronizing 48 which irradiates a laser beam for synchronizing is disposed in a vicinity of the polygon mirror 46. A collimator lens 50 is disposed at the laser beam irradiating side of the semiconductor laser for synchronizing 48. The laser beam irradiated from the semiconductor laser for synchronizing 48 is made into a parallel bundle of rays at the collimator lens 50, and is then made incident onto the polygon mirror 46. The laser beam for recording, which is irradiated from the laser beam irradiating device 32, and the laser beam for synchronizing, which exits from the collimator lens 50, are illuminated onto substantially the same region of the polygon mirror 46, and are deflected in the same way in the main scanning direction as the polygon mirror 46 rotates, and are made incident on a fθ lens 52 disposed at the laser beam exiting side of the polygon mirror 46.

A cylindrical lens 33 for correcting the tilt of the surface of a polygon mirror and a drum 54 are disposed along the scanning direction in that order on the optical path of the laser beam for recording which has passed through the fθ lens 52. An unillustrated photosensitive material is wound on the drum 54. The laser beam for recording is illuminated onto the recording surface of the photosensitive material, and is scanned over the range illustrated by the broken line in FIG. 2 due to deflection by the polygon mirror 46. Further, due to the rotation of the drum 54, the position at which the laser beam is illuminated onto the photosensitive material moves in the subscanning direction as well, so that an image is recorded onto the photosensitive material.

Hereinafter, the direction corresponding to the main scanning direction of the laser beam which passes through the scanning optical system, such as the polygon mirror 46, the fθ lens 52, and the like, and which is illuminated onto the drum 54 is called the meridional direction, and the direction corresponding to the subscanning direction thereof is called the sagittal direction. Further, the plane which includes the direction of the optical axis of the laser beam and the meridional direction is called the meridional plane, and the plane which includes the optical axis direction and the sagittal direction is called the sagittal plane.

A reflecting mirror 56 is disposed along the scanning direction of the laser beam for synchronizing on the optical path thereof. A linear encoder 58 is disposed at the laser beam exiting side of the reflecting mirror 56. The laser beam for synchronizing is deflected by the polygon mirror 46 so as to scan the range illustrated by the dot-chain line in FIG. 2. The linear encoder 58 is formed such that a plurality of band-shaped, non-transparent portions having equal widths are formed at predetermined intervals on a transparent plate member. An unillustrated photoelectric converter is disposed at the laser beam exiting side of the linear encoder 58. When the laser beam is scanned on the linear encoder 58, the photoelectric converter receives the laser beam which has passed through the transparent portions, and a pulse signal is outputted from the photoelectric converter.

Figure 3A:
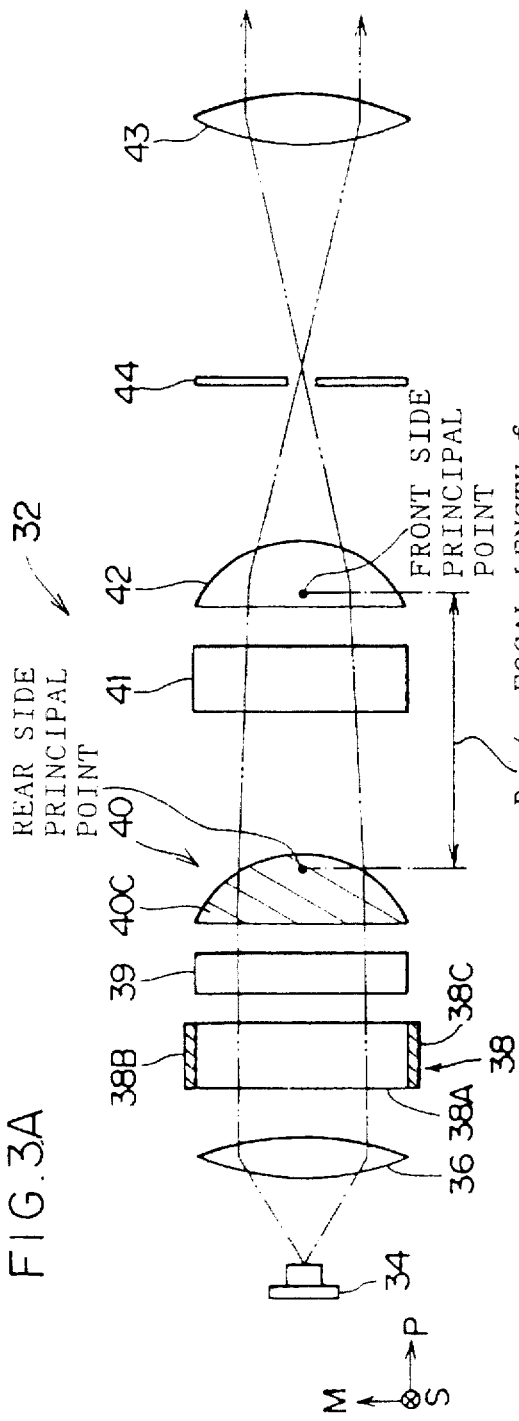
FIG. 3A is a plan view illustrating a meridional direction schematic structure of a laser beam irradiating device relating to a first embodiment.
Figure 3B:
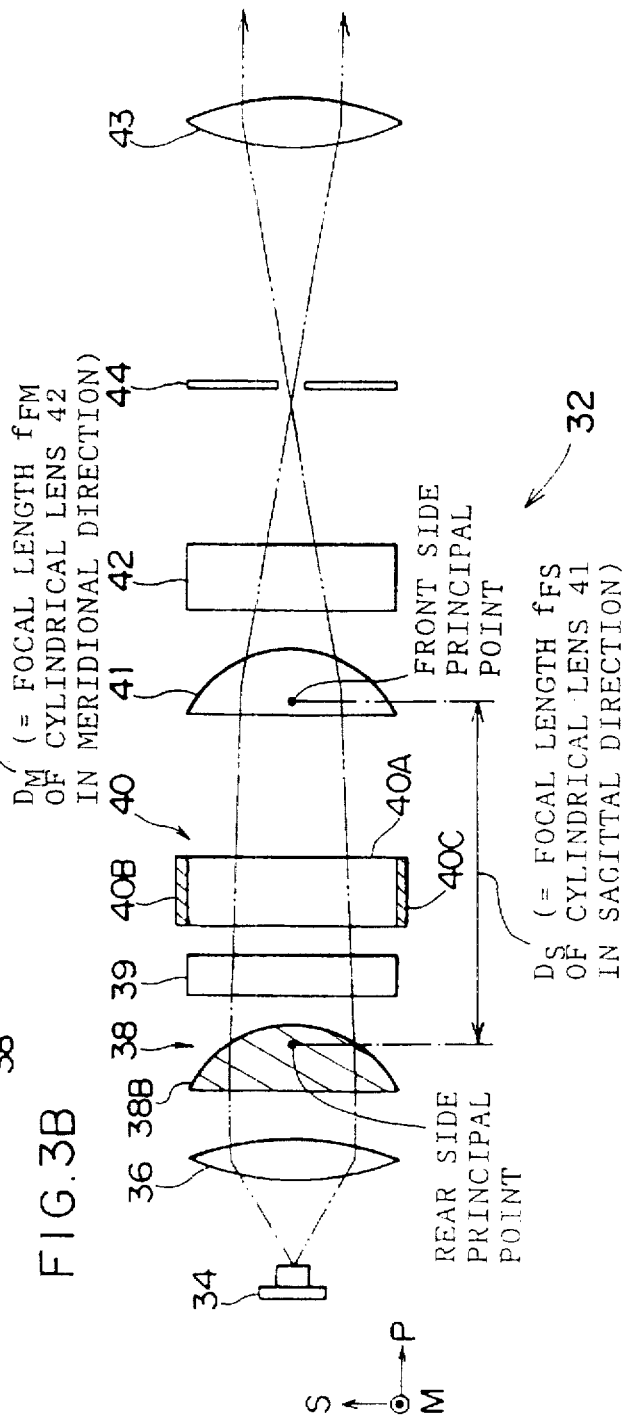
FIG. 3B is a plan view illustrating a sagittal direction schematic structure of the laser beam irradiating device relating to the first embodiment.

The laser beam irradiating device 32 will now be described. As illustrated in FIGS. 3A and 3B, the laser beam irradiating device 32 includes a semiconductor laser 34. In FIGS. 3A and 3B, the arrow M indicates the meridional direction, and the arrow S indicates the sagittal direction. The semiconductor laser 34 is modulated, by an unillustrated modulating device, in accordance with the image to be recorded and at a timing synchronous with the pulse signal, and a laser beam corresponding to the image to be recorded is irradiated.

A collimator lens 36 is disposed at the laser beam irradiating side of the semiconductor laser 34. The laser beam irradiated from the semiconductor laser 34 is made into substantially parallel light at the collimator lens 36, and exits therefrom. The variable focal position optical system relating to the present invention is disposed at the laser beam exiting side of the collimator lens 36 and includes, in the following order, an optical element 38 and a half-wave plate 39 serving as a variable focal length lens subsystem; an optical element 40 serving as a variable focal length lens subsystem; a cylindrical lens 41 serving as a fixed focal length lens subsystem; and a cylindrical lens 42 serving as a fixed focal length lens subsystem.

Figure 4:
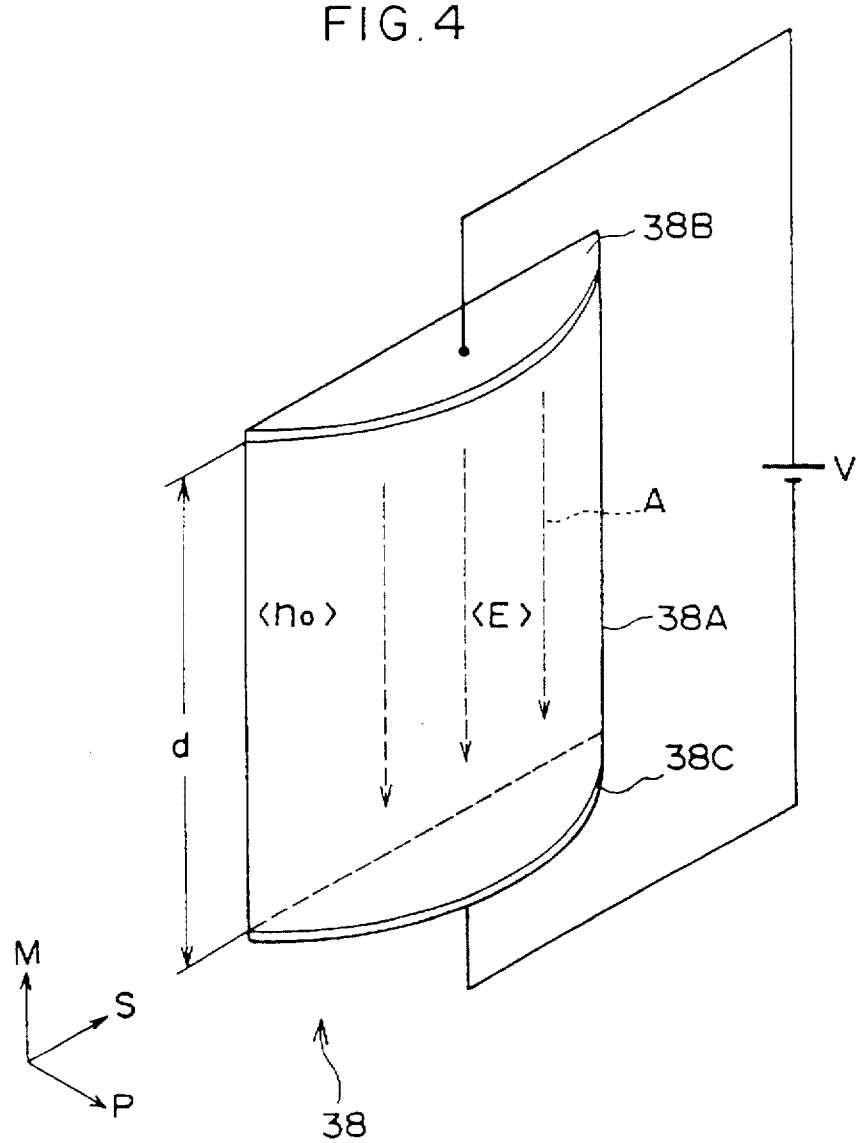
FIG. 4 is a perspective view illustrating an example of an optical element which serves as a variable focal length lens subsystem.

As illustrated in FIG. 4, the optical element 38 is provided with a electrooptic medium 38A which is formed as if a cylinder was cut along a plane parallel to the axis of the cylinder. Namely, the electrooptic medium 38A is formed such that a pair of parallel planes corresponding to the upper surface and lower surface thereof are respectively enclosed by a circular arc and a chord. The electrooptic medium 38A is formed by PLZT serving as an electrooptic material, and exhibits an electrooptical effect. Further, electrodes 38D, 38C are each deposited over the entire surface of one of the pair of parallel planes of the electrooptic medium 38A.

In the optical element 38 illustrated in FIGS. 3A and 3B, the direction in which the electrooptic medium 38A has lens power is disposed so as to run along the sagittal plane of the incident laser beam. The focal length $f_{VS}$ of the electrooptic medium 38A in the sagittal direction is determined by the following formula (6) in which $n_0$ is the refractive index of the electrooptic medium 38A and r is the radius of curvature of the circular arc shaped portions of the parallel planes.

$$f_{VS} = r \div (n_0 - 1) \qquad (6)$$

Accordingly, the laser beam incident on the optical element 38 is refracted only within the sagittal plane of the laser beam and exits from the optical element 38. However, in a case in which voltage is not applied between the electrodes 38B, 38C, the substantially parallel laser beam incident on the electrooptic medium 38A is refracted such that the beam waist in the sagittal direction is formed at the position of the focal length $f_{VS}$ in the sagittal direction, and the laser beam exits. Here, the polarization direction corresponds to the direction of arrow M in FIG. 3.

Further, when voltage is applied between the electrodes 38B, 38C, a uniform electric field is applied between the electrodes 38B, 38C, i.e., between the parallel planes of the inner portion of the electrooptic medium 38A. When a voltage V is applied between the electrodes 38B, 38C, given that the distance between the electrodes 38B, 38C is d, the strength E of the electric field between the electrodes 38B, 38C is:

$$E = V \div d \qquad (7)$$

The direction of the magnetic field is the direction of arrow A in FIG. 4. Due to this magnetic field, when the secondary electrooptic coefficient (Kerr coefficient) of the electrooptic material forming the electrooptic medium 38A is $R_{33}$, the refractive index in the meridional direction of the electrooptic medium 38A is varied from the refractive index $n_0$ to the refractive index n expressed by the following formula (8).

$$\begin{aligned} n &= n_0 \cdot \left( 1 - \frac{1}{2} n_0^2 \cdot R_{33} \cdot E^2 \right) \\ &= n_0 \cdot \left( 1 - \frac{1}{2} n_0^2 \cdot R_{33} \cdot V^2 \div d^2 \right) \end{aligned} \qquad (8)$$

In accordance with formula (8), the refractive index of the electrooptic medium 38A varies proportionately to the square of the strength E of the electric field, i.e., varies proportionately to the square of the voltage V applied between the electrodes 38B, 38C. Further, because the electric field at this time is a uniform electric field, the refractive index in the meridional direction of the electrooptic medium 38A variation in uniformly. Due to the variation in refractive index, the focal length $f_{VS}$ of the electrooptic medium 38A in the sagittal direction when the voltage V is applied between the electrodes 38B, 38C varies in accordance with following formula (9).

$$\begin{aligned} f_{VS} &= r + (n-1) \\ &= r + \left\{ n_0 \cdot \left( 1 - \frac{1}{2} n_0^2 \cdot R_{33} \cdot V^2 \div d^2 \right) - 1 \right\} \end{aligned} \qquad (9)$$

In this way, at the optical element 38, when no voltage is applied between the electrodes 38B, 38C, the electrooptic medium 38A has a predetermined lens power in the sagittal direction in FIG. 4. Therefore, as compared with the optical element disclosed in Japanese Patent Application Laid-Open No. 1-230017, when the distance between the optical element and the beam waist position of the light beam in a predetermined direction is short on the whole, it is possible to apply less voltage between the electrodes 38B, 38C, and there is no need to create a refractive index distribution which generates lens power at the interior of the electrooptic medium 38A. Therefore, the effect of the aberration caused by the difference between the generated refractive index distribution and an ideal refractive index distribution can be eliminated, and even in a case in which a laser beam is refracted by high lens power, the beam waist diameter can be prevented from becoming large.

The half-wave plate 39 and the optical element 40 are disposed in that order at the laser beam exiting side of the optical element 38. The laser beam exiting from the optical element 38 passes through the half-wave plate 39, and the polarization direction thereof is thereby rotated 90 degrees so as to correspond to the direction of arrow S in FIG. 3, and the laser beam is incident on the optical element 40. The optical element 40 is structured in the same way as the optical element 38. The optical element 40 is provided with an electrooptic medium 40A formed as if a cylinder had been cut along a plane parallel to the axis of the cylinder. Electrodes 40B, 40C are each formed over the entire surface of one of the parallel planes of the electrooptic medium 40A.

At the optical element 40, the direction in which the electrooptic medium 40A has lens power is disposed along the meridional plane. Accordingly, the focal length $f_{VM}$ of the optical element 40 in the meridional direction varies in proportion to the square of the voltage applied between the electrodes 40B, 40C. The laser beam incident on the optical element 40 is refracted only within the meridional plane of the laser beam, and exits from the optical element 40.

The cylindrical lens 41 disposed at the laser beam exiting side of the optical element 40 is disposed such that, in the same way as the optical element 38, the direction in which the optical element 40 has lens power corresponds to the sagittal direction. The cylindrical lens 41 is disposed such that the distance $D_S$ (see FIG. 3B) between the principal point of the cylindrical lens 41 at the laser beam incident side (hereinafter, "front side principal point") and the principal point of the optical element 38 at the laser beam exiting side (hereinafter, "rear side principal point") is equal to the focal length $f_{FS}$ of the cylindrical lens 41 in the sagittal direction.

The cylindrical lens 42 disposed at the laser beam exiting side of the cylindrical lens 41 is disposed such that the direction in which the cylindrical lens 42 has lens power corresponds to the meridional direction, in the same way as the optical element 40. The cylindrical lens 42 is disposed such that the distance $D_M$ (see FIG. 3A) between the front side principal point of the cylindrical lens 42 and the rear side principal point of the optical element 40 is equal to the focal length $f_{FM}$ of the cylindrical lens 42 in the meridional direction.

The lens 43 is disposed at the laser beam exiting side of the cylindrical lens 42. The beam waist of the laser beam which exits from the cylindrical lens 42 is formed temporarily, and after the beam diameter expands, the laser beam is incident on the lens 43. At the lens 43, the laser beam is made into a parallel bundle of rays, exits from the laser beam irradiating device 32, and is incident on the polygon mirror 46. A spatial filter 44 is disposed at the position at which the beam waist of the laser beam between the cylindrical lens 42 and the lens 43 is formed.

The spatial filter 44 is formed by pinholes being formed in a non-transparent plate member, and cuts the scattered light component of the laser beam. It is well-known that the scattered light component arising when a light beam passes through PLZT cannot be ignored. The scattered light component of the laser beam is cut by the spatial filter 44.

Figure 5:
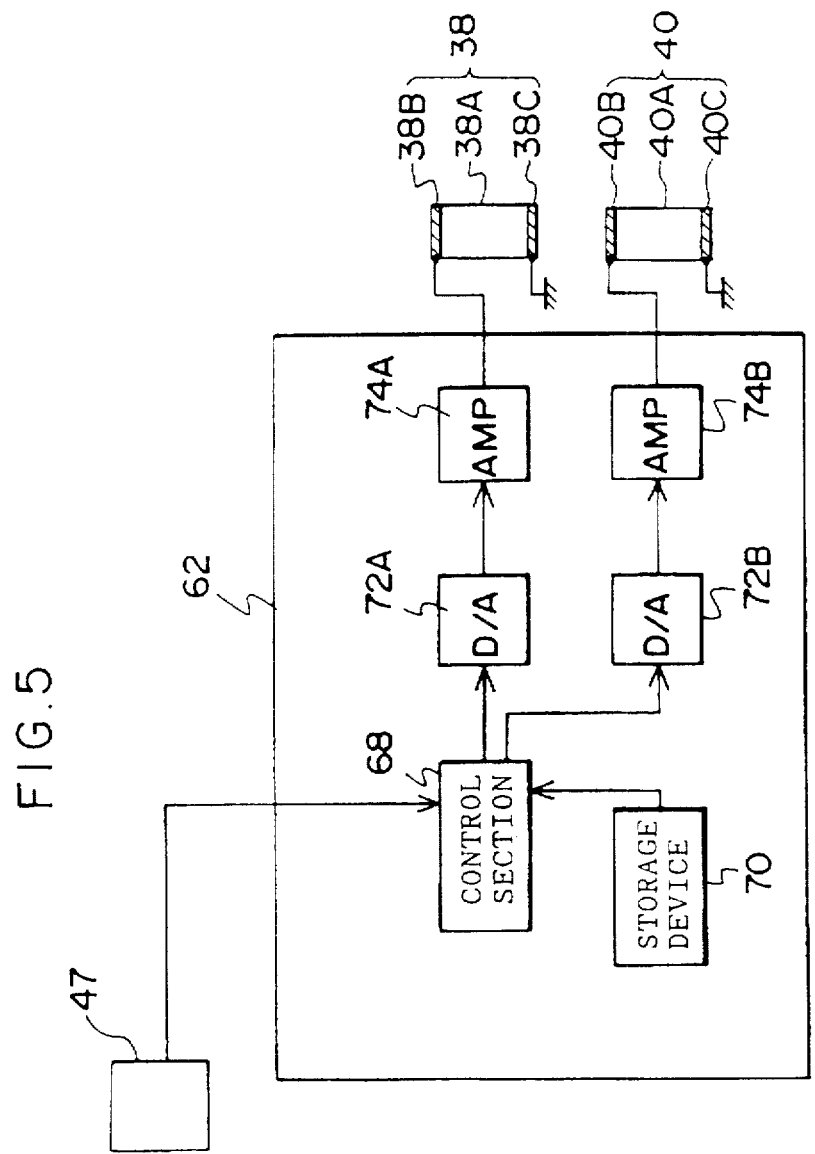
FIG. 5 is a block view illustrating a schematic structure of a focal position control device.

Turning again to FIG. 2, the drive control circuit 47 is connected to a focal position control device 62. The drive control circuit 47 outputs to the focal position control device 62 a signal representing the illumination position of the laser beam along the main scanning direction. The focal position control device 62 is structured as illustrated in FIG. 5. Namely, the signal inputted from the drive control circuit 47 is inputted to a control section 68. The control section 68 is formed by a microcomputer in which a CPU, RAM, ROM and the like are connected together by busses such as data busses, address busses or the like. The control section 68 is connected to a storage device 70.

In the laser beam recording device 30 of the first embodiment, the meridional direction and sagittal direction beam waist positions of the laser beam when the laser beam is illuminated onto the photosensitive material wound on the drum are successively measured while the illumination position is moved along the main scanning direction. As illustrated in FIG. 6, data representing an image surface 100 in the meridional direction and an image surface 102 in the sagittal direction are obtained in advance.

The deviation $\Delta Z_S$ of the image surface 102 in the sagittal direction with respect to a reference surface (the recording surface of the photosensitive material) at each position along the main scanning direction is determined. Correction data for correcting the deviation $\Delta Z_S$ by the optical element 38 is calculated. The correction data and the respective positions are set in correspondence and stored in the storing device 70 as a first table. Further, the deviation $\Delta Z_M$ of the image surface 100 in the meridional direction with respect to the reference surface (the recording surface of the photosensitive material) at each position along the main scanning direction is determined. Correction data for correcting the deviation $\Delta Z_M$ by the optical element 40 is calculated. The correction data and the respective positions are set in correspondence and stored in the storing device 70 as a second table.

Given that the lateral magnification of the optical system (including the lens 43 of the laser beam irradiating device 32 and the scanning lens 52 ) through which the laser beam irradiated from the variable focal position optical system passes is β, when the beam waist position of the laser beam which position is formed at the laser beam exiting side of the variable focal position optical system moves ΔS, the amount of movement ΔS' of the beam waist position of the laser beam exiting from the scanning lens 52 is as follows:

$$\Delta S' = \Delta S \cdot \beta^2 \quad (10)$$

The above-mentioned correction data is calculated on the basis of the deviation $\Delta Z_S$ or $\Delta Z_M$, and on the basis of formulae (5), (8), (9) and (10). Given that the beam waist diameter of the laser beam exiting from the variable focal position optical system is ω', the beam waist diameter ω" of the laser beam exiting from the scanning lens 52 is:

$$\omega'' = \omega' \cdot \beta \quad (11)$$

Digital/analog converters (D/A converters) 72A, 72B are connected to the output side of the control section 68. On the basis of the signal from the drive control device 47, the control section 68 determines the illumination position of the laser beam along the main scanning direction. The correction data corresponding to this illumination position is fetched from the first table stored in the storage device 70 and is outputted to the D/A converter 72A. Further, the correction data corresponding to the illumination position is fetched from the second table and is outputted to the D/A converter 72B.

An amplifier circuit 74A is connected to the output end of the D/A converter 72A, and the electrode 38B of the optical element 38 is connected to the amplifier circuit 74A. The electrode 38C is grounded. The correction data outputted from the control section 68 is converted at the D/A converter 72A into an analog signal whose voltage level corresponds to the value of the correction data. The signal is amplified and boosted at the amplifier circuit 74A, and is supplied to the electrode 38B. Accordingly, voltage of a level corresponding to the magnitude of the correction data outputted from the control section 68 is applied between the electrodes 38B, 38C. Similarly to the above structure, an amplifier circuit 74B is connected to the output end of the D/A converter 72B, and the electrode 40B is connected to the amplifier circuit 74B. The electrode 40C is grounded. In the same way as described above, voltage is applied between the electrodes 40B, 40C.

Next, operation of the first embodiment will be described. The laser beam irradiated from the semiconductor laser 34 successively passes through the collimator lens 36, the optical element 38, the half-wave plate 39, the optical element 40, the cylindrical lenses 41, 42, the spatial filter 44, and the lens 43, and is irradiated from the laser beam irradiating device 32.

The laser beam for recording which is irradiated from the laser beam irradiating device 32 is deflected along the main scanning direction by the polygon mirror 46 together with the laser beam for synchronizing, and is scanned on the recording surface of the photosensitive material. Further, the laser beam for synchronizing is scanned onto the light receiving surface of the linear encoder 58. The laser beam which has passed through the transparent portions of the linear encoder 58 due to this scanning is received at the unillustrated electrooptic converter, and a pulse signal is inputted from the electrooptic converter to the drive control circuit 47. At, the drive control circuit, 47, a signal representing the illumination position of the laser beam along the main scanning direction is outputted to the control section 68 of the focal position control circuit 62.

On the basis of the signal inputted to the control section 68, corresponding correction data is successively fetched from the first table and the second table in accordance with the movement of the illumination position of the laser beam along the main scanning direction. The correction data is outputted to the D/A converters 72A, 72B. In this way, voltage of a level corresponding to the correction data fetched from the first table is applied between the electrodes 38B, 38C of the optical element 38 via the D/A converter 72A and the amplifier circuit 74A. Further, voltage of a level corresponding to the correction data fetched from the second table is applied between the electrodes 40B, 40C of the optical element 40 via the D/A converter 72B and the amplifier circuit 74B.

When voltage is applied between the electrodes 38B, 38C of the optical element 38, a uniform electric field corresponding to the value of the applied voltage is applied to the electrooptic medium 38A of the optical element 30. The sign of the secondary electrooptic coefficient (Kerr coefficient) $R_{33}$ of the PLZT forming the electrooptic medium 38A of the optical element 38 is positive. Accordingly, as is clear from formula (8), due to the application of the voltage, the refractive index in the direction in which the electrooptic element 38A has lens power decreases in proportion to the square of the applied voltage, and the lens power decreases (the focal length $f_{VS}$ becomes longer).

At the laser beam irradiating device 32, the laser beam irradiated from the semiconductor laser 34 is refracted within the sagittal plane by the optical element 38 and the cylindrical lens 41. As described above, the optical element 38 and the cylindrical lens 41 are disposed such that the distance $D_S$ between the rear side principal point of the optical element 38 and the front side principal point of the cylindrical lens 41 is equal to the focal length $f_{FS}$ of the cylindrical lens 41 in the sagittal direction. Therefore, in the optical system formed by the optical element 38 and the cylindrical lens 41, the focal length $f_{CS}$ in the sagittal direction, the focal position in the sagittal direction, the beam waist diameter $\omega_S'$ in the sagittal direction, and the amount of variation $\Delta S_S$ in the focal position (beam waist position) in the sagittal direction are as determined by above formulae (2) through (5) respectively.

In this way, the beam waist position in the sagittal direction of the laser beam, which is irradiated from the laser beam irradiating device 32 and illuminated onto the drum 54, moves in accordance with formulae (5) and (10) in accordance with the focal length $f_{VS}$ of the optical element 38 which becomes longer as the voltage applied between the electrodes 38B, 38C of the optical element 38 increases. As is clear from formula (4), even if the focal length $f_{VS}$ of the optical element 38 varies, the beam waist diameter $\omega_S'$ in the sagittal direction of the laser beam emerging from the variable focal position optical system does not vary. Therefore, as is clear from formula (11), the beam waist diameter $\omega_S''$ in the sagittal direction of the laser beam illuminated onto the drum 54 is constant.

As described above, at the focal position control circuit 62, correction data is fetched from the first table on the basis of the signal outputted from the drive control circuit 47. The fetched correction data is converted into an analog signal which is amplified, and voltage is applied between the electrodes 38B, 38C of the optical element 38. Therefore, the deviation $\Delta Z_S$ of the laser beam illuminated onto the drum 54 is substantially zero from the one end to the other end in the main scanning direction, and the image surface 102 in the sagittal direction corresponds to the recording surface of the photosensitive material wound on the drum 54.

When voltage is applied between the electrodes 40B, 40C of the optical element 40 as well, the refractive index in the direction in which the electrooptic medium 40A has lens power decreases in proportion to the square of the applied voltage, and the lens power decreases (the focal length $f_{VM}$ becomes longer). The optical element 40 and the cylindrical lens 42 of the laser beam irradiating device 32 are also disposed such that the distance $D_M$ between the rear side principal point of the optical element 40 and the front side principal point of the cylindrical lens 42 is equal to the focal length $f_{FM}$ of the cylindrical lens 42 in the meridional direction. Therefore, in the optical system formed by the optical element 40 and the cylindrical lens 42, the focal length $f_{CM}$ in the meridional direction, the focal position, the beam waist diameter $\omega_M'$, and the amount of change $\Delta S_M$ in the focal position (beam waist position) are as determined by above formulae (2) through (5) respectively.

In this way, the beam waist position in the meridional direction of the laser beam, which is irradiated from the laser beam irradiating device 32 and illuminated onto the drum 54, moves in accordance with formulae (5) and (10) in accordance with the focal length $f_{VM}$ of the optical element 40 which becomes longer as the voltage applied between the electrodes 40B, 40C of the optical element 40 increases. As is clear from formula (4), even if the focal length $f_{VM}$ of the optical element 40 varies, the beam waist diameter $\omega_M'$ in the meridional direction of the laser beam emerging from the variable focal position optical system does not vary. Therefore, as is clear from formula (11), the beam waist diameter $\omega_M''$ in the meridional direction of the laser beam illuminated onto the drum 54 is constant.

As described above, at the focal position control circuit 62, correction data is fetched from the second table on the basis of the signal outputted from the drive control circuit 47. The fetched correction data is converted into an analog signal which is amplified, and voltage is applied between the electrodes 40B, 40C of the optical element 40. Therefore, the deviation $\Delta Z_M$ of the laser beam illuminated onto the drum 54 is substantially zero from the one end to the other end in the main scanning direction, and the image surface 100 in the meridional direction corresponds to the recording surface of the photosensitive material wound on the drum 54.

In this way, the beam waist positions of the laser beam incident on the fθ lens 52 are moved by variations in the focal lengths of the optical elements 38, 40. Due to this movement, the beam waist positions of the laser beam in the meridional direction and the sagittal direction from one end to the other end in the scanning direction always correspond to the recording surface of the photosensitive material. Further, the beam waist diameter of the laser beam does not vary, regardless of variations in the focal lengths of the optical elements 38, 40. Accordingly, a high-quality image can be obtained without drawbacks such as portions of the image recorded on the photosensitive material being unclear.

The above description includes an example in which the distance $D_S$ is made equal to the focal length $f_{FS}$ of the cylindrical lens 41 and the distance $D_M$ is made equal to the focal length $f_{FM}$ of the cylindrical lens 42. However, the present invention is not limited to the same. If the distances and focal lengths are close values, even if they are not exactly equal, variations in the beam waist positions $\omega_S''$, $\omega_M''$ accompanying variations in the focal lengths $f_{FS}$, $f_{FM}$ can be suppressed.

In the above explanation, the deviations $\Delta Z_S$, $\Delta Z_M$ of the image surfaces are measured in advance, correction data is determined, and the focal length of the variable focal length lens subsystem is varied on the basis of the correction data. However, the beam waist position fluctuates in accordance with variations in characteristics and variations in the positions of the respective lenses and the like which are due to variations in the ambient temperature. Therefore, the ambient temperature may be measured by a detecting means such as a temperature sensor, and the focal length of the variable focal length lens subsystem (the voltage applied to the optical element 38 in the present embodiment) may be corrected.

A second embodiment of the present invention will be described hereinafter. Other than the laser beam irradiating device 32, the second embodiment is structured in the same way as the first embodiment. Therefore, for portions of the second embodiment other than the laser beam irradiating device 32, the same reference numerals are used, and description thereof is omitted.

As illustrated in FIG. 7, in the laser beam irradiating device 32 relating to the second embodiment, a single rotation symmetry lens 80, which serves as a fixed focal length lens subsystem, is used in place of the cylindrical lenses 41, 42. In this way, the structure of the variable focal position optical system can be simplified, the reliability of the device can be improved, and the cost thereof can be reduced. In this structure, the position of the rear side principal point of the optical element 38 and the position of the rear side principal point of the optical element 40 cannot be made to coincide. Therefore, it is impossible to dispose the optical elements 38, 40 and the lens 80 such that the distance $D_S$ between the rear side principal point of the optical element 38 and the front side principal point of the lens 80, and the distance $D_M$ between the rear side principal point of the optical element 40 and the front side principal point of the lens 80 are respectively equal to the focal length $f_F$ of the lens 80.

As a result, in the second embodiment, the lens 80 is disposed at least such that the following formula (12) is satisfied and such that the difference between the distance $D_S$ and the focal length $f_F$ and the difference between the distance $D_M$ and the focal length $f_F$ are respectively less than or equal to predetermined values.

$$\text{MIN}[D_S, D_M] \leq f_F \leq \text{MAX}[D_S, D_M] \tag{12}$$

In the second embodiment, because $D_M < D_S$ as shown in FIG. 7, formula (12) becomes:

$$D_M \leq f_F \leq D_S$$

In order to make the difference between the distance $D_S$ and the focal length $f_F$ and the difference between the distance $D_M$ and the focal length $f_F$ small respectively, first, it is essential to make the distance between the optical element 38 and the optical element 40 as small as possible. As for specifically what values the differences between the focal length $f_F$ and the distances $D_S$, $D_M$ are to be set to, the lens 80 can be disposed such that, for example, the difference between the distance $D_S$ and the focal length $f_F$ and the difference between the distance $D_M$ and the focal length $f_F$ are equal. In this case, when the focal length $f_{VS}$ of the optical element 38 and the focal length $f_{VM}$ of the optical element 40 are respectively varied, large variations in one of the sagittal direction beam waist diameter $\omega_S$" and the meridional direction beam waist diameter $\omega_M$" are suppressed.

When the laser beam is scanned and the image is recorded, in a case in which, for example, the recording density in the main scanning direction and the recording density in the subscanning direction are different, the ratio of the decrease in image quality to the variation in beam waist diameter differs for the main scanning direction and the subscanning direction, and the allowance with respect to the beam waist diameter of the illuminated laser beam differs for the main scanning direction and the subscanning direction. In such a case, it is preferable to arrange the optical elements 38, 40 and the lens 80 such that the distance D corresponding to the direction in which the allowance is smaller becomes the value which is closest to the focal length $f_F$ compared with the other distance D, or such that the distance D corresponding to the direction in which the allowance is smaller is equal to the focal length $f_F$.

For example, in a case in which the recording density in the subscanning direction is low and the allowance for variations in the beam waist diameter is small, it is preferable to arrange the optical elements 38, 40 and the lens 80 either such that the distance $D_S$ corresponding to the subscanning direction (the sagittal direction in the present embodiment) becomes the value closest to the focal length $f_F$ as compared with the distance $D_M$ or such that the distance $D_S$ is equal to the focal length $f_F$. In this way, it is difficult for irregularities in density or the like due to variations in the beam waist diameter to occur. Therefore, deterioration in image quality can be suppressed.

Lenses which are preferable for the variable focal length lens subsystem relating to the present invention, which lenses respectively comprise an electrooptic medium equipped with a pair of parallel planes and formed so as to have lens power in a predetermined direction and exhibiting an electrooptical effect, and electrodes which are provided respectively at the pair of parallel planes such that a uniform electric field is applied between the pair of parallel planes within the electrooptic medium, are not limited to the optical element 38 illustrated in FIG. 4. For example, in the optical element 20 illustrated in FIG. 8A, the configuration of an electrooptic medium 20A is a cylinder in which the parallel planes are circular, such as a so-called "rodless". The electrooptic medium 20A has lens power in the direction of arrow Y in FIG. 8. Accordingly, when a light beam is incident along the direction of arrow Z in FIG. 8, the light beam is refracted within a predetermined plane including the arrow Y and the arrow Z. Further, electrodes 20B, 20C are provided over the entire surfaces of the axial direction end surfaces of the cylinder of the electrooptic medium 20. Accordingly, when voltage is applied between the electrodes 20B, 20C, a uniform electric field is applied between the axial direction end surfaces. By varying the magnitude of the voltage, the converging position of the light beam within the above-mentioned predetermined plane can be changed.

In an optical element 22 illustrated in FIG. 8B, the configuration of an electrooptic medium 22A is an elliptic cylinder in which the parallel planes are elliptic. In the same way as the electrooptic medium 20A of the optical element 20, the electrooptic medium 22A has lens power in the direction of arrow Y in FIG. 8. Further, electrodes 22B, 22C are provided over the entire surfaces of the axial direction end surfaces of the elliptic cylinder. Accordingly, when voltage is applied between the electrodes 22B, 22C, a uniform electric field is applied between the axial direction end surfaces. By varying the magnitude of the voltage, the converging position of the light beam within the predetermined plane can be changed.

In an optical element 24 illustrated in FIG. 8C, the configuration of each parallel plane of an electrooptic medium 24A is a shape such as the cross-section of a Fresnel lens, and the electrooptic medium 24A is a pillar having such parallel planes as axial direction end surfaces. As a result, the electrooptic medium 24A has lens power in the direction of arrow Y in FIG. 8 in the same way as described above. Electrodes 24B, 24C are provided over the entire surfaces of the axial direction end surfaces. Accordingly, when voltage is applied between the electrodes 24B, 24C, a uniform electric field is applied between the axial direction end surfaces. By varying the magnitude of the voltage, the converging position of the light beam within the predetermined plane can be changed.

In the above explanation, an example was described in which a semiconductor laser is used as the light source, and a laser beam irradiated from the semiconductor laser is used as the light beam. However, the light source for irradiating a laser beam may be a gas laser such as a He—Ne laser, an Ar laser, or the like. The laser beam irradiated from the gas laser may be modulated by a modulator such as an AOM, an EOM or the like. Further, an LED may be used as the light source, and the light beam irradiated from the LED may be used as the light beam in the present invention.

Further, the above description includes an example in which a device which illuminates a laser beam directly onto the photosensitive material and records an image is used as the laser beam recording device. However, the present invention is also applicable to, for example, a laser beam recording device which serves as a light source When an image is recorded by an electrophotographic method such that an electrostatic latent image is recorded on a photoreceptor drum which has been charged in advance.

In the above explanation, the laser beam recording device is used as a light beam scanning apparatus. However, the present invention is also applicable to a light beam reading apparatus which reads an image or the like by using a light beam such as a laser beam.

As described above, the first aspect of the present invention is a variable focal position optical system including a variable focal length lens subsystem and a fixed focal length lens subsystem, wherein the variable focal length lens subsystem and the fixed focal length lens subsystem are arranged such that a distance between a principal point of the variable focal length lens subsystem and a principal point of the fixed focal length lens subsystem is substantially equal to the focal length of the fixed focal length lens subsystem. Therefore, a superior effect is achieved in that it is possible to move only the focal position with hardly any variation in the beam diameter at the focal position of the incident light beam.

The second aspect of the present invention is a variable focal position optical system including first and second variable focal length lens subsystems and first and second fixed focal length lens subsystems, wherein the first variable focal length lens subsystem and the first fixed focal length lens subsystem are arranged such that a distance between a principal point of the first variable focal length lens subsystem and a principal point of the first fixed focal length lens subsystem is substantially equal to the focal length of the first fixed focal length lens subsystem, and the second variable focal length lens subsystem and the second fixed focal length lens subsystem are arranged such that a distance between a principal point of the second variable focal length lens subsystem and a principal point of the second fixed focal length lens subsystem is substantially equal to the focal length of the second fixed focal length lens subsystem. Therefore, a superior effect can be achieved in that the beam waist positions along a first predetermined direction and a second predetermined direction of the light beam can be moved independently without variation in the beam waist diameter of the light beam.

The third aspect of the present invention is a variable focal position optical system including first and second variable focal length lens subsystems and a single fixed focal length lens subsystem wherein the respective lens subsystems are arranged such that a difference between the focal length of the fixed focal length lens subsystem and a distance between a principal point of the first variable focal length lens subsystem and a principal point of the fixed focal length lens subsystem, and a difference between the focal length of the fixed focal length lens subsystem and a distance between a principal point of the second variable focal length lens subsystem and a principal point of the fixed focal length lens subsystem, are respectively less than or equal to predetermined values. Therefore, excellent effects can be achieved in that the beam waist positions along a first predetermined direction and a second predetermined direction of the incident light beam can be moved independently, the structure of the variable focal position optical system can be simplified, and variations in the beam diameter along the first predetermined direction and the second predetermined direction can respectively be kept small.

In the fourth aspect of the present invention, the variable focal position optical system of any of the first through the third aspects is disposed on the optical path of a light beam. The focal length of the variable focal length lens subsystem of the variable focal position optical system is controlled such that the beam waist position of the light beam scanned onto an object to be illuminated substantially corresponds to the surface to be illuminated. Therefore, an excellent effect is achieved in that a light beam of a substantially constant beam diameter can be illuminated onto the object to be illuminated.

What is claimed is:

1. A light beam scanning apparatus comprising:

a scanning optical system which scans a light beam irradiated from a light source onto an object to be illuminated;

a variable focal position optical system whose focal position is variable, said variable focal position optical system including a first variable focal length lens subsystem which has lens power in a first direction orthogonal to an optical axis and whose focal length is variable, a second variable focal length lens subsystem which has lens power in a second direction, which is orthogonal to the optical axis and which is different than said first direction, and whose focal length is variable, and a fixed focal length lens subsystem whose focal length is fixed and which is positioned such that said first variable focal length lens subsystem and said second variable focal length lens subsystem are positioned at a side of one principal point of said fixed focal length lens subsystem, said respective lens subsystems being arranged such that a difference between the focal length of said fixed focal length lens subsystem and a distance between a principal point of said first variable focal length lens subsystem and a principal point of said fixed focal length lens subsystem, and a difference between the focal length of said fixed focal length lens subsystem and a distance between a principal point of said second variable focal length lens subsystem and a principal point of said fixed focal length lens subsystem are respectively less than or equal to predetermined values; and a control device which controls the focal position of said variable focal position optical system such that a beam waist position of the light beam scanned onto said object substantially coincides with a surface of said object.

2. A light beam scanning apparatus according to claim 1, wherein said control device measures deviation of the beam waist position from the surface of said object, and varies the focal position of said variable focal position optical system by using an electrooptical effect.

* * * * *